(No Model.)
O. M. BRYAN.
HORSE DRIVER.
No. 456,013. Patented July 14, 1891.
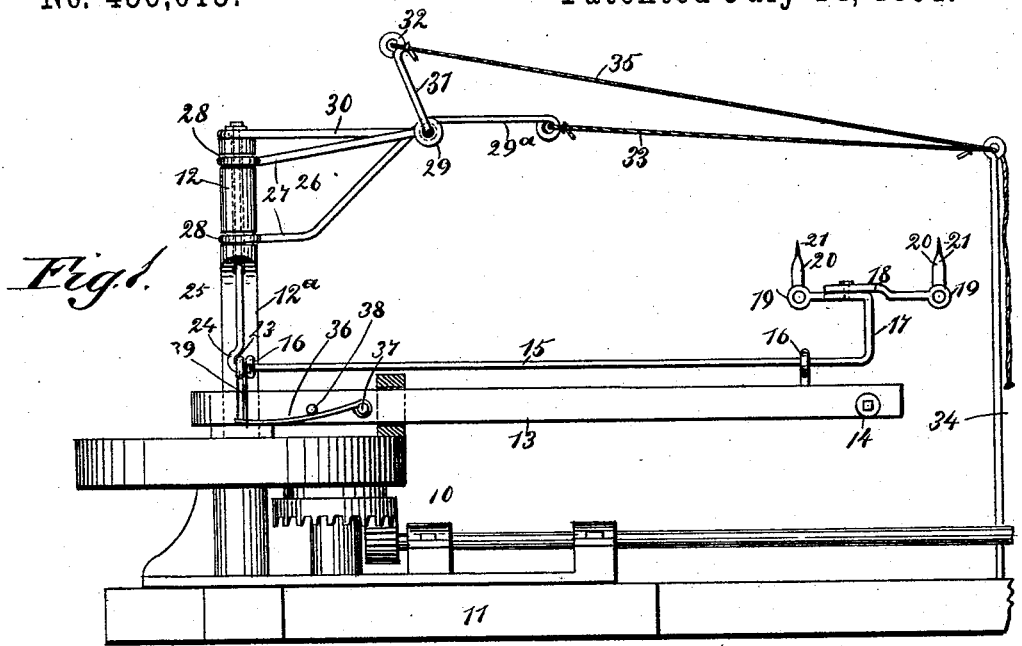
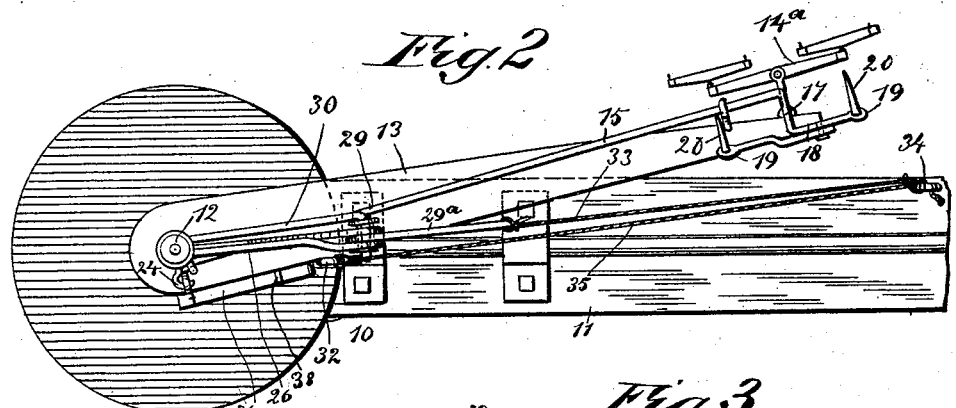
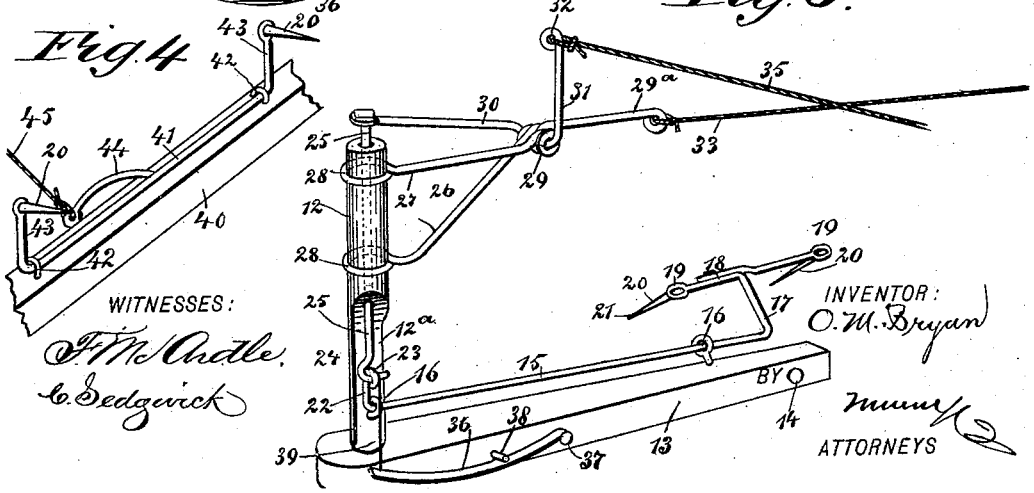
WITNESSES:
F. McArdle
C. Sedgwick
INVENTOR:
O. M. Bryan
BY
ATTORNEYS
THE NORRIS PETERS CO., PHOTO-LITHO., WASHINGTON, D. C.

UNITED STATES PATENT OFFICE.

OSCAR M. BRYAN, OF WILSON COUNTY, NEAR CHANUTE, KANSAS.

HORSE-DRIVER.

SPECIFICATION forming part of Letters Patent No. 456,013, dated July 14, 1891.

Application filed March 19, 1891. Serial No. 385,636. (No model.)

*To all whom it may concern:*

Be it known that I, OSCAR M. BRYAN, of Wilson county, Kansas, near Chanute, in the county of Neosho and State of Kansas, have invented a new and Improved Horse-Driver, of which the following is a full, clear, and exact description.

My invention relates to improvements in drivers for horses; and the object of my invention is to produce a device which may be applied to all kinds of horse-powers and to other devices on which work-horses are used, by means of which the horses may be urged forward without requiring a special driver, and which may be adjusted so that as applied to a pair of horses if one horse is slow or lazy and the other quick and irritable the slow horse may be urged without exciting the other.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a side elevation of the mechanism embodying my invention, showing the same applied to an ordinary sweep-power. Fig. 2 is a plan view of the same. Fig. 3 is a detail perspective view showing the device and the sweep, and Fig. 4 is a broken perspective view showing the manner in which the invention is applied to a singletree or other support.

In the main views of the drawings I have shown the invention as applied to an ordinary sweep-power; but it may be applied to horse-powers of any description.

10 is the gearing of the power, which is of the usual kind, and rests upon a base 11, and extending upward from the gearing is a revoluble post 12, which is of the ordinary character, except that it is cut away on one side, as shown at 12ª in Figs. 1 and 3. A sweep 13, of the usual construction, extends laterally from the post and is provided with a link 14 at its free end to afford means of attaching a singletree 14ª, and extending longitudinally along the top of the sweep is a rod 15, which is held to turn in keepers 16, one of which is arranged near the free end of the sweep and the other of which is secured to the post 12. The keeper on the free end of the sweep may be adjusted on the sweep to accommodate a long or short hitch. The outer end of the rod 15 is bent upward at a right angle, as shown at 17, and terminates at a cross-bar 18, which bar is formed into rings or sockets at each end, so that the prods 20, which extend upward and forward, may be easily inserted in the sockets. The cross-bar 18 is made in two pieces, which overlap and are held together by a bolt, and consequently the cross-bar may be made longer or shorter, according to the distance between the horses. The prods are to spur the horses forward, and they terminate in brads 21, which are secured to their forward ends. The free end of the rod 15 is bent upward after it passes through the inner keeper 16, as shown at 22, and terminates in an eye 23, which receives a hook 24 on the lower end of a rod 25, and the rod 25 extends upward through the post 12 and is held to slide vertically therein, the upper end of the rod terminating in a head. Extending laterally from the upper portion of the post 12 is a bracket 26, which is composed of two members 27, and these are formed at their inner ends into rings 28, which rings are clasped around the post and held in grooves, so that the bracket may swing loosely therefrom, and the outer end of the bracket is formed into a coil or collar 29, and extending from this collar outward is an arm 29ª, which terminates in an eye. A rod 30 is secured to the upper end of the rod 25 and is bent so as to extend through the collar 29, and then extends upward, as shown at 31 in Figs. 1 and 3, and terminates in an eye 32. It will thus be seen that the rod 30 is formed into an elbow-lever, and when the vertical arm 31 is swung outward the inner end of the rod will be raised, thus lifting the rod 25 and the bent end 22 of the rod 15, which bent end serves as a crank, and the rod 15 will turn in the keepers 16 and throw the cross-bar 18 and the prods 20 forward, so that they strike the horses. A stay-rope may be secured to any convenient support to hold the bracket in a desired position. As shown in the drawings, it is secured to a post 34, which is arranged adjacent to the outer end of the sweep. A rope 35 is secured in the eye 32 of the rod 30, and this rope extends through an eye in the upper end of the post 34 to a point where it may be conveniently operated by the person running the power. The crank end 22 of the rod 15 is normally held downward and the cross-bar 18 swung backward by means of a spring 36, which is pivoted on the sweep at one end, as shown at 37, and the upward movement of which is limited by a stud 38, secured to the sweep, and the free end of the spring 36 is connected with the hook 24 of the rod 25 by means of a rod 39.

It will be readily seen that the cross-bar 18 may be made of a length to correspond with the distance which the horses are apart where two horses are used, or it may be arranged for a single horse, and it will be seen, too, that the prods 20 may be made of any desired length to accommodate themselves to the length of the hitch, so that the prods may reach the horses whether they are near to or far from the singletree. If but one horse needs urging, one of the prods 20 may be dispensed with and the other prod arranged so as to strike the lazy horse.

To operate the device, the rope 35 is pulled, thus lifting the rod 30 and the rod 25, and this movement tilts the rod 15 in the manner described and throws the prods against the horses.

In Fig. 4 I have shown means for applying the invention to a plow or other device, and in this case the singletree 40 or other support adjacent to the horses is provided on the upper side with a rod 41, which turns in keepers 42 near each end, the ends 43 of the rod 41 being bent upward and terminating in eyes adapted to receive the prods 20, which will extend forward at an angle. Near the center of the rod 41 is secured a rod 44, which extends rearward and downward and terminates in an eye, and to this eye is attached a cord 45, 45, which extends to a point where it may be conveniently reached by the driver, and if he desires to urge the horses he pulls the rod, thus turning the rod or arm 44 and tilting the rod 41, which movement throws forward the prods 20, so that they will strike the horses.

Having thus described my invention, I claim as new and desire to secure by Letters Patent—

1. A horse-driver comprising a crank-rod adapted to be secured to a support and having its outer end bent and provided with projecting prods, a slidable rod secured to the crank and mounted in a support, a bracket hinged to the support, an elbow-lever pivoted in the bracket and having one arm secured to the sliding rod, and a cord secured to the other arm of the elbow-lever, substantially as described.

2. The combination, with the crank-rod having prods at one end, as described, of a support at one end of the crank-rod, a slidable rod mounted in the support and connected with the crank, a swinging bracket mounted on the support so as to extend laterally therefrom, said bracket having a projecting arm to receive a stay-rope, and an elbow-lever pivoted in the bracket, one arm of the lever being secured to the sliding rod and the other arm being adapted to receive a cord, substantially as described.

3. A horse-driver of the character described, comprising a spring-pressed crank-rod having its outer end bent at a right angle and provided with a cross-bar carrying prods, a slidable rod mounted in a support and connected with the crank of the crank-rod, and a lever mechanism for moving the sliding rod, substantially as described.

OSCAR M. BRYAN.

Witnesses:
ZACH. T. POSTLETHWAITE,
A. W. POSTLETHWAITE.